Jan. 12, 1932.    J. C. BARR    1,841,079
GRAVEL CLEANER
Filed May 21, 1929    2 Sheets-Sheet 1
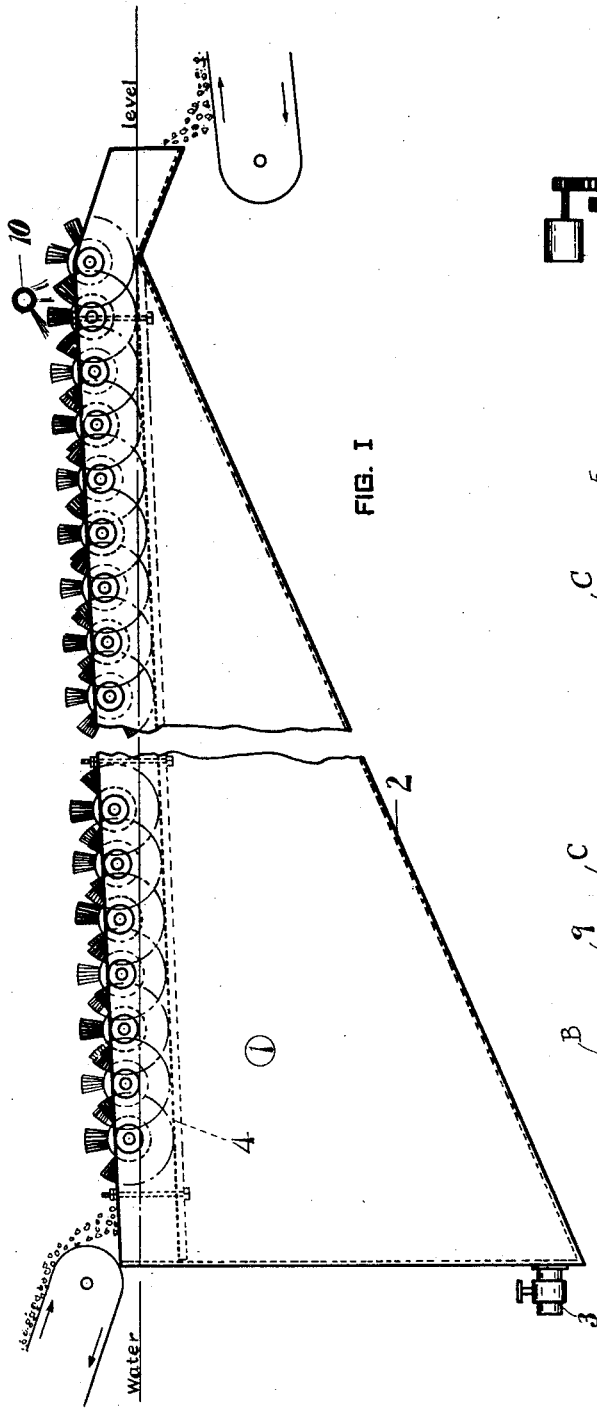
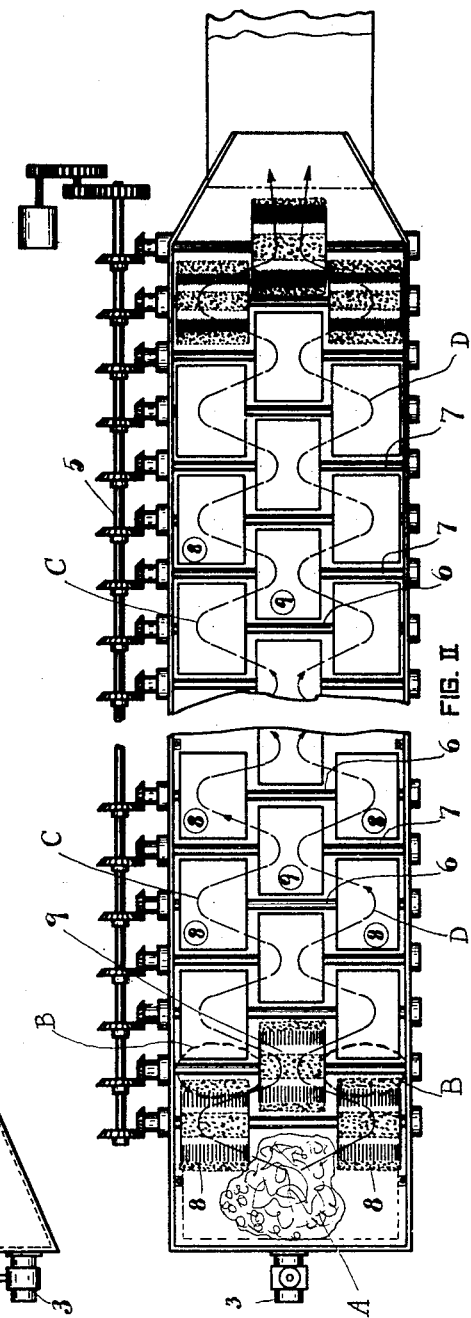
INVENTOR
Joseph Carroll Barr
by Christy Christy and Wharton
his attorneys

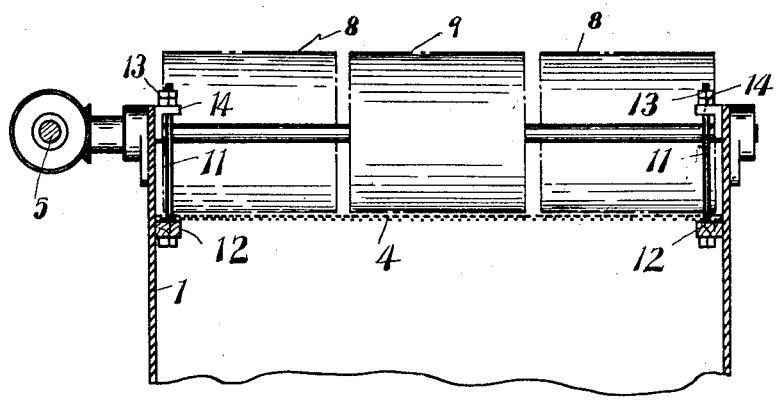
FIG. III
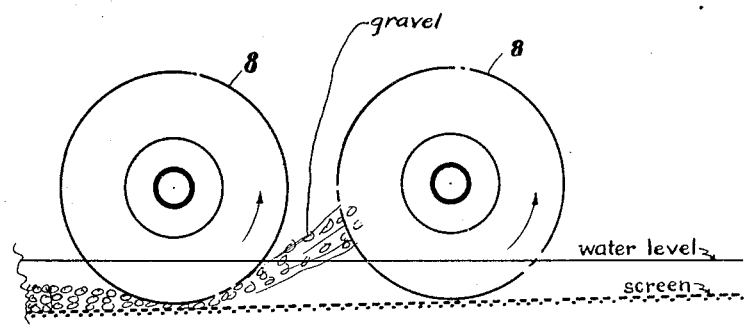
FIG. IV
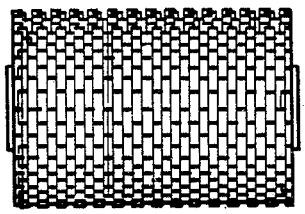
FIG. V
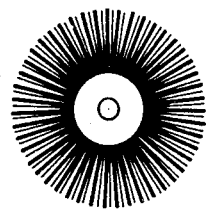
FIG. VI
INVENTOR
Joseph Carroll Barr
by Christy Christy & Wharton
his attorneys Patented Jan. 12, 1932

1,841,079

UNITED STATES PATENT OFFICE

JOSEPH CARROLL BARR, OF PITTSBURGH, PENNSYLVANIA

GRAVEL CLEANER

Application filed May 21, 1929. Serial No. 364,825.

This invention relates to gravel cleaning apparatus.

Gravel as it comes from the bank has usually intermixed therewith a certain proportion of clay. This clay may have relatively great cohesive and adhesive properties, so that it is difficult to remove it from the surface of a relatively large particle of gravel. An even more serious disadvantage of the clay is that it tends to form clay balls, with particles of gravel included therein.

Dirty gravel, compacted masses of clay, and clay balls comprising several particles of gravel within the clay envelope, render the gravel unsatisfactory for use in making structural concrete. This is for the obvious reason that the clay and clay balls do not have the requisite crushing strength, such as is provided by clean gravel.

With clay of relatively great cohesive and adhesive properties the usual methods of washing are unsuccessful. A rotary washer tends to build up clay balls to an increased size, rather than to break them up and wash away the clay, so that the gravel may be left clean. Coal washers, in which a relatively light brushing action is employed, are also unsatisfactory. While such brushing may tend to clean the surface of relatively large lumps of coal, it is ineffective to break up clay balls and adequately cleanse the particles of gravel.

The object of the invention is to provide an apparatus which operates positively to break up conglomerate masses of clay and gravel, and which cleanses the surface of the gravel, leaving it clean and in suitable condition for inclusion in concrete as an ingredient thereof.

In the drawings Figure I is a broken side elevation of the gravel cleaning apparatus of the present invention; Figure II is a plan view of the same, indicating certain of the brushes of the apparatus diagrammatically; Figure III is a cross sectional view through the apparatus, illustrating the vertical adjustability of the screen thereof; Figure IV is a diagrammatic view, showing the action of the brushes in cleaning the gravel; Figure V is a detail side elevation of one of the brushes; and Figure VI is a detail end view thereof.

In the drawings the reference numeral 1 designates a tank; which has desirably an inclined bottom 2 to cause water and undesired substances such as clay, sand, and fine particles of gravel, to be collected, and discharged from the tank by way of outlet 3. Mounted in the tank 1 is a screen 4, which must be of relatively great strength and rigidity, and which is desirably a perforated metallic plate. The power transmitting means of the apparatus are mounted exteriorly of the tank. Such means comprise a longitudinally extending driven shaft 5 geared to a plurality of shafts 6 and 7, which extend transversely of the tank. Carried by the shafts 6 are brushes 8. These brushes are disposed on the shafts adjacent the sides of the tank, in mutual alignment, leaving an interval therebetween.

The shafts 7 lie between the bristles of adjacent brushes 8, and have thereon brushes 9, lying longitudinally between the shafts 6 and transversely between the brushes 8. In order to secure the desired effect, the brushes should be so closely mounted longitudinally of the screen 4 that the bristles of each of the brushes 9 wholly over-lap the bristles of adjacent brushes 8, extending as far as the hubs of such adjacent brushes. The longitudinal rows of brushes comprising the brushes 8 and 9 are also closely spaced transversely of the screen in order to produce the effect hereinafter described. The relative vertical position of the screen 4 and all the brushes 8 and 9 is such that the bristles of the brushes actually contact or have but slight clearance with the surface of the screen. The bristles of the brushes should be of steel capable of withstanding the abrasive effect of contact with the gravel. Water is supplied to the tank by suitable means, such as a perforated pipe 10, disposed adjacent the discharge end of the screen, and the screen is desirably so positioned in the tank that there is a relatively great depth of water overlying its receiving end, and little or no water overlying it adjacent its discharge end.

In use of the apparatus the gravel to be cleaned is delivered by any suitable form of conveyor to the receiving end of the screen, where it tends to form a pile A. The brushes 8 of the exterior rows, which lie adjacent the pile A detach particles of gravel from the edges of this pile and propel them longitudinally of the screen. In addition to this longitudinal propulsion, and the scrubbing action exerted by the bristles of the brushes on the gravel, the particles are pinched against the screen, adjacent the edges of the brushes, and are flipped transversely of the screen as well as forwardly thereof, so that they tend to form a pile B. The adjacent brush 9 of the intermediate row flips these particles of gravel outwardly, as well as forwardly, into position where they are contacted by the next succeeding pair of brushes 8. It will be noted that the arrangement of the brushes 8 and 9 adjacent the receiving end of the screen is such as to permit the formation of this initial gravel pile A.

This action is continued along the length of the screen, there being a constant tendency for the outer brushes to pass the gravel to the inner, and for the inner to return it to the brushes of the outer rolls. There is also a tendency for the gravel to pile in various positions, but because of the close spacing of the brushes such piles are not permitted to assume any great size, but are continuously disintegrated by the action of the brushes. The tortuous paths followed by the gravel are indicated by the arrows C and D in Figure II of the drawings.

Because of the constant pinching and flipping of the gravel, clay balls are completely broken up, and each particle of gravel receives a thorough scrubbing during its passage longitudinally of the screen. It may be also noted that the centrifugal whirling of the clay balls from one brush on to the bristles of another brush causes the bristles of the receiving brush to break up the ball and receive the scattered clay. The clay in such spread or scattered condition is readily washed from the bristles during rotation of the brush. At the delivery end of the screen the gravel is discharged by the final brushes to any desired receptacle or conveyor.

Desirably the screen 4 is so mounted that it is vertically adjustable in order that it may be maintained in contact with the bristles as they become worn down in use. Such arrangement, shown in detail in Figure III of the drawings, comprises supporting bolts 11, passing through the frame 12 of the screen and having nut 13 bearing against brackets 14 on the walls of the tank 1. This mounting provides a simple vertical adjustment for the screen.

What I claim is:

1. In gravel cleaning apparatus the combination of a relatively rigid screen, and a plurality of rotatable brushes mounted in mutually staggered relation and arranged to cooperate with the screen and with each other to propel the gravel along said screen in a tortuous path, the arrangement of the brushes at the receiving end of the screen being such as to leave space to the side of the initially effective brushes to permit an initial piling of the gravel therein.

2. In gravel cleaning apparatus the combination of a relatively rigid screen, mounting means for said screen arranged to provide vertical adjustment of the screen, and a plurality of rotatable brushes mounted in mutually staggered relation and arranged to cooperate with the screen and with each other to propel the gravel along said screen in a tortuous path.

3. In gravel cleaning apparatus the combination of a relatively rigid screen with a plurality of longitudinal rows of stiff rotatable brushes so mounted that the brushes of two of the adjacent rows are mutually staggered, said brushes being so mounted with respect to the screen as to bear upon gravel to force it directly against the screen and exert a flipping action on the gravel and the intervals between brushes being such as to permit free travel of gravel and clay when flipped from the bristles of one brush to the bristles of a succeeding brush.

4. In gravel cleaning apparatus the combination of a relatively rigid screen, at least two rows of stiff rotatable brushes arranged in mutual alignment transversely of the screen, and rotatable brushes intermediate said rows and arranged in staggered relation to the other rows with the bristles thereof overlapping the bristles of brushes in the exterior rows, the intervals between brushes being such as to permit free travel of gravel from row to row through a relatively short distance and the brushes being so mounted with respect to the screen as to bear upon gravel on the screen to force it directly thereagainst and to exert a flipping action on the gravel.

In testimony whereof I have hereunto set my hand.

JOSEPH CARROLL BARR.